United States Patent [19]

Krabbenhoft et al.

[11] Patent Number: 5,797,995
[45] Date of Patent: *Aug. 25, 1998

[54] METHOD FOR THERMAL REMOVAL OF HALOGENATED ORGANIC COMPOUNDS FROM SOIL

[75] Inventors: Herman Otto Krabbenhoft, Scotia; Jimmy Lynn Webb, Ballston Lake, both of N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 611,609

[22] Filed: Mar. 8, 1996

Related U.S. Application Data

[63] Continuation of Ser. No. 407,454, Mar. 29, 1995, abandoned.

[51] Int. Cl.$^6$ .................... B08B 3/08; B08B 3/10
[52] U.S. Cl. .................... 134/19; 134/3; 134/11; 134/12; 134/25.1; 134/41
[58] Field of Search .................... 134/3, 25.1, 19, 134/26, 40, 41, 42, 11, 12

[56] References Cited

U.S. PATENT DOCUMENTS

| | | | |
|---|---|---|---|
| 3,084,076 | 4/1963 | Loucks et al. | 134/22.1 |
| 4,415,335 | 11/1983 | Mainwaring et al. | 44/1 C |
| 4,574,013 | 3/1986 | Peterson | 134/2 |
| 4,792,413 | 12/1988 | Nash et al. | 134/40 X |
| 5,051,030 | 9/1991 | Saha et al. | 405/128 |
| 5,055,196 | 10/1991 | Darian et al. | 210/638 |
| 5,156,686 | 10/1992 | Van Slyke | 134/26 |
| 5,305,886 | 4/1994 | Kehl et al. | 209/2 |

*Primary Examiner*—Zeinab El-Arini
*Attorney, Agent, or Firm*—James Magee, Jr.; Douglas E. Stoner

[57] ABSTRACT

A method for removing halogenated organic compounds from contaminated particulate material. Formic acid is dry mixed with the contaminated material and an external heating means is used at temperatures of about 250°–450° C. for 10–50 minutes to drive the halogentated organic compounds from the soil.

7 Claims, No Drawings

METHOD FOR THERMAL REMOVAL OF HALOGENATED ORGANIC COMPOUNDS FROM SOIL

This application is a Continuation of application Ser. No. 08/407,454 filed Mar. 29, 1995, and now abandoned.

FIELD OF THE INVENTION

This invention is directed to the remediation of particulate material contaminated with halogenated organic compounds. Particularly, the invention relates to the removal of chlorinated organic compounds from materials by mixing formic acid with the contaminated material and then dry heating said material.

BACKGROUND OF THE INVENTION

Compounds such as polychlorinated biphenyls (PCBs), dichloro-diphenyl trichloroethane (DDT), trichloroethylene (TCE), and chlorinated benzenes have been found to be persistent compounds in the environment. Due to spills and prior usage, these compounds are often found in soil, sludge and building materials. Their disposal requires a safe and efficient means.

Various methods for the removal or destruction of halogenated organic compounds are known. For example, the Peterson U.S. Pat. No. 4,574,013 discloses a process wherein a heated slurry of contaminated soil is treated with a mixture of an alkaline constituent and a sulfoxide catalyst. This process is disadvantageous in that the sulfoxide catalyst may transport contaminants into living systems, the sulfoxide catalyst produces odorous compounds when heated to high temperatures and decomposes into combustible by-products, and the process requires large amounts of reagents.

Additionally, polychlorinated biphenyls in contaminated soils have been removed by the use of incineration and surfactant-assisted washing. These methods are quite costly or require complex operations. For example, surfactant-assisted soil-washing requires many unit operations in order to remove the polychlorinated biphenyls from the soil and to regenerate the surfactant wash solution.

Copending and commonly assigned U.S. Patent Application, entitled "Process for Remediation of a Contaminated Particulate Material," filed May 16, 1994, Ser. No. 08/242,768, discloses a method that removes halogenated organic contaminants from particulated material by utilizing a thermal desorption sweep with a vapor stream containing water and an amine or amide organic additive.

A need exists for an improved method to remediate contaminated materials that achieves acceptable removal levels of halogenated organic contaminants, particularly polychlorinated biphenyls, without using steam to sweep contaminants from the material. The elimination of steam removes the need to recycle water from the steam used in the process. A need also exists for a process with a degradable additive, that is compatible with the environment. A further need exists to utilize an additive that is relatively inexpensive, safe to handle, and works efficiently in ex situ and in situ processes.

SUMMARY OF THE INVENTION

This invention fulfills these needs by providing a method for the removal of halogenated organic compounds dispersed within contaminated particulate material where formic acid is admixed with the contaminated material, and subsequently the admixture is heated at a temperature between about 250°–450° C., for a time sufficient to substantially remove the halogenated compounds from the particulate material.

This invention is a simple and cost-effective process that remediates soils containing halogenated organic compounds, in particular polychlorinated biphenyls (PCBs), such that residual polychlorinated biphenyl levels would be less than or equal to two parts per million. Additionally, this invention relates to a thermal process such that steam is not used and therefore, does not need to be recycled. Further, this invention uses an additive, formic acid, which facilitates the thermal removal of polychlorinated biphenyls from soil without leaving any residue of or from the additive on the treated soil. Finally, the process of this invention can be applied to soil in an in situ manner so that considerable savings in soil excavation can be realized.

Therefore, an object of this invention is to provide a simple process that would remediate particulate material contaminated with polychlorinated biphenyls and other halogenated organic compounds so that the residual contaminant level in the material would be less than or equal to ten parts per million, preferably less than or equal to five parts per million, and even more preferably, less than or equal to two parts per million.

It is also an object of this invention to provide a method wherein environmentally acceptable levels of halogenated organic compounds are achieved in treated materials within a short period of time in a cost effective manner without sweeping steam or a gas through the contaminated materials.

DETAILED DESCRIPTION OF THE INVENTION

A method is taught for the remediation of particulate material contaminated with halogenated organic compounds which comprises the steps of admixing the particulate material with an effective amount of formic acid to form an admixture; and heating the admixture at atmospheric pressure with an external means of heat at a temperature between about 250°–450° C., for a time sufficient to substantially remove all of the halogenated organic compounds from the particulate material.

The term "substantially remove" means that ten parts per million or less of the halogenated organic contaminant remain in the particulate material after completion of this method. The preferred amount of removal of contaminant is less than or equal to about two parts per million. This invention can be applied to any amount of contaminant present in the particulate material. For example, it is conceivable that an amount of a contaminant, such as polychlorinated biphenyl, may be present up to about 100,000 parts per million in the particulate material undergoing the treatment of this invention.

A sufficient amount of time to substantially remove the contaminant from the particulate material is about ten to about fifty minutes for ex situ applications, with about ten to thirty minutes being preferred. In situ applications, where the particulate material is not removed from its natural environment, may require longer periods of time, depending on the type of particulate material being treated, the depth of the contamination, and the type of heating element being used.

The term "effective amount of formic acid" herein means about one to fifteen weight percent of formic acid mixed with the contaminated particulate material. About two to five weight percent of the additive is the preferred amount, and about two weight percent is the most preferred amount. The weight percent of the formic acid is based on the total weight of the particulate material to be treated.

The term "halogenated organic compounds" as contaminants includes aliphatic compounds, such as, but not limited to, trichloroethylene, trichloroethane, and perchloroethylene; and aromatic compounds, such as, but not limited to, polychlorinated biphenyls, dioxins, chlorobenzene, and pentachlorophenols. Brominated organic compounds that are found to be hazardous also can be removed by the claimed process. The process is especially suited for polychlorinated biphenyls (PCBs) in soil.

The process is conducted by dry heating the contaminated particulate material until the contaminate is released from the material and collected in a condenser. Dry heating refers to a source of heat other than steam, gases, vaporized mixtures, heated liquids, and the like, that are swept or added to the particulate material. In other words, the heating of the particulate material is not initiated by passing steam, gases, vapors, or heated fluids through the material. Dry heating of the contaminated particulate material is accomplished by an external heating means. External heating means include, but are not limited to, heating coils, heating rods, molten salt baths, thermal blankets, indirect flames, and the like. The external heating means is an indirect source of heat that is applied to the contaminated material. The heating may be performed in ex situ or in situ applications.

The process is conducted at temperatures that heat the particulate material with external heating elements so that the contaminant is volatilized and is removed from the material. Such process temperatures range from about 250°–450° C. A preferred temperature range is about 370°–410° C., and a most preferred temperature range is about 385°–395° C. The heating is conducted at atmospheric pressure. Atmospheric pressure means one atmosphere pressure, approximately 760 mm of mercury pressure, or a non-vacuum system.

The contaminated particulate materials are generally porous and may comprise, but are not limited to, soil, sand, sludge, sediment, gravel, pulverized concrete, and the like. The present method is particularly adapted for use with soil.

Formic acid is suitable as the additive in this invention. It significantly enhances the process of stripping halogenated organic contaminants from particulate material. The weight percent of formic acid utilized is based on the total weight of particulate material being treated. The formic acid is added to the particulate material as an aqueous solution. For instance, if 2 weight percent of formic acid is required, and commercial grade formic acid is 92%, then the solution of formic acid is 92 grams of formic acid and 8 grams of water. From this solution, the appropriate amount of 2 weight percent formic acid can be calculated, and added to the particulate material. In actuality this would be 2.17 grams of formic acid solution.

As an example of the invention, Table 1 demonstrates the use of two weight percent formic acid admixed with soil for the removal of polychlorinated biphenyls in an ex situ application. Heating was conducted at atmospheric pressure. The polychlorinated biphenyl concentration in the soil was 9000 parts per million. To this PCB-contaminated soil, two percent by weight of formic acid was added by dry-mixing. The heating of the admixture of PCB-soil and formic acid for about twenty to thirty minutes at about 390° C., without any sweep gas or steam, provides residual PCB levels of 0.8 to 2.3 parts per million. This process was repeated on soil to which no formic acid was added and resulted in residual PCB levels of 2.4 to 8.5 parts per million. Table 1 displays the pertinent information.

TABLE 1

| Effect of Formic Acid for Stripping PCBs from Soil at 390° C. | | | | |
|---|---|---|---|---|
| Formic Acid (weight %) | PCB (ppm) 15 min. | PCB (ppm) 20 min. | PCB (ppm) 25 min. | PCB (ppm) 30 min. |
| 0.0 wt. % | 8.5 ppm | 6.6 ppm | 3.1 ppm | 2.4 ppm |
| 2.0 wt. % | | 2.3 ppm | 1.4 ppm | 0.8 ppm |

The above table demonstrates the invention for ex situ application where the particulate material is removed from its natural environment and treated. After treatment, the particulate material is returned to the environment.

This invention can also be practiced in situ. This is accomplished by leaving the particulate material in its natural place. Heat may be applied in various ways, such as by drilling bores, making tunnels, passages, or wells in the particulate material and placing heating elements, such as rods, coils, and the like in the them. Thermal heating blankets may also be utilized by spreading such heating blankets on the surface of the contaminated material.

EXAMPLE

In a typical experiment, a stainless steel cell comprised of a one-inch diameter tube equipped with Swagelok fittings at each end, one of which is fitted with a plug, is filled with the polychlorinated biphenyl contaminated soil.

One experimental cell uses straight polychlorinated biphenyl contaminated soil which had been air-dried to constant weight. A second experimental cell is filled with an admixture of air-dried polychlorinated biphenyl contaminated soil and 2.0 weight percent formic acid.

Each cell then is connected to a condenser by a one sixteenth (1/16) inch tubing exit line. Each cell is placed in a molten salt bath. The molten salt does not come in contact with the soil itself. The bath containing the molten salt serves as a dry heating means for the polychlorinated biphenyl contaminated soil.

The effluent from the cell passes through the condenser so that the liberated polychlorinated biphenyls and any other volatile substances from the soil, such as but not limited to, residual sorbed water, are condensed. After a period of time sufficient to remove the polychlorinated biphenyls from the soil, about thirty minutes, the cells are each removed from the molten salt bath. The soil is then removed from each cell and analyzed for residual polychlorinated biphenyl content.

Table 1 depicts the results for the above-mentioned procedure, using soil with 9000 parts per million polychlorinated biphenyls at 390° C. in a molten salt bath for a time up to thirty minutes.

What is claimed:

1. A method for decontamination of particulate materials contaminated with halogenated organic compounds which consists of admixing with the contaminated materials about one to fifteen weight percent based on the weight of the contaminated particulate materials of formic acid, dry heating the resulting admixture to a temperature of 250° C. to 450° C., by external means, for a time sufficient to volatilize and remove the halogenated organic compounds and the formic acid, as vapor, from the particulate material, and collecting the halogenated organic compounds and formic acid vapor by condensation.

2. A method according to claim 1 where the contaminated particulate material is selected from the group consisting of soil, gravel, sludge, sediment, sand, and concrete.

3. A method according to claim 1 where the halogenated organic compound is a polychlorinated biphenyl.

4. A method according to claim 1 where the halogenated organic compound is trichloroethylene.

5. A method according to claim 1 where an effective amount of formic acid to form an admixture is about 2 weight percent.

6. A method according to claim 1 where the temperature for heating the contaminated particulate material is about 390° C.

7. A method according to claim 1 where the external heating means is selected from the group consisting of molten salt baths, coiled heating elements, heating rods, and thermal blankets.

* * * * *